United States Patent
Arpee

(10) Patent No.: US 7,630,327 B2
(45) Date of Patent: Dec. 8, 2009

(54) METHOD FOR DATA MAINTENANCE AND INTEGRATION INCLUDING INTERPOLATION

(75) Inventor: John Arpee, Herndon, VA (US)

(73) Assignee: Andrew LLC, HIckory, NC (US)

( * ) Notice: Subject to any disclaimer, the term of this patent is extended or adjusted under 35 U.S.C. 154(b) by 384 days.

(21) Appl. No.: 11/485,338

(22) Filed: Jul. 13, 2006

(65) Prior Publication Data

US 2007/0165541 A1 Jul. 19, 2007

Related U.S. Application Data

(60) Provisional application No. 60/698,527, filed on Jul. 13, 2005.

(51) Int. Cl.
*G01S 3/02* (2006.01)
*G01D 18/00* (2006.01)
(52) U.S. Cl. .................. 370/254; 342/465; 702/86; 709/224; 714/37
(58) Field of Classification Search .......... 370/328, 370/254; 709/234, 224, 86; 714/37; 342/465; 702/86
See application file for complete search history.

(56) References Cited

U.S. PATENT DOCUMENTS

| | | | |
|---|---|---|---|
| 6,285,321 B1 * | 9/2001 | Stilp et al. | 342/465 |
| 6,487,404 B1 | 11/2002 | Kransmo et al. | |
| 6,625,135 B1 | 9/2003 | Johnson et al. | |
| 2001/0052087 A1 * | 12/2001 | Garg et al. | 714/37 |
| 2003/0109999 A1 * | 6/2003 | Stein et al. | 702/86 |
| 2003/0120826 A1 | 6/2003 | Shay | |
| 2006/0224730 A1 * | 10/2006 | Fok et al. | 709/224 |
| 2007/0165541 A1 * | 7/2007 | Arpee | 370/254 |

* cited by examiner

*Primary Examiner*—William D Cumming
(74) *Attorney, Agent, or Firm*—Duane Morris LLP

(57) ABSTRACT

A system and method of managing collection and maintenance of performance data for a wireless communications network including collecting configuration data for the network, encoding the collected configuration data and storing the data, collecting a transmitted signal, measuring a parameter of the collected signal, and encoding and storing the parameter. These steps are repeated for additional configurations of the network. The transmitted signals are transmitted by a base station or a mobile device. Further, the transmitted signals are collected by a base station or a mobile device.

13 Claims, 9 Drawing Sheets

METHOD FOR DATA MAINTENANCE AND INTEGRATION INCLUDING INTERPOLATION

The disclosure claims the filing-date benefit of Provisional Application No. 60/698,527 filed 13 Jul. 2005, the specification of which is incorporated herein in its entirety.

BACKGROUND

The operation of a wireless communication network requires periodic maintenance and testing to ensure that the system is optimally employed. Currently, wireless communication network providers use a variety of tools to plan, design, deploy, test, and maintain their systems.

One problem that has been encountered is that the tools of the various vendors may not be compatible with each other. Additionally, the tools may not be compatible with the information normally collected and maintained by the wireless network provider relating to the performance of the wireless communication system. For example, data may be maintained in a format which is compatible with one vendor's evaluation tool but incompatible with another vendor's evaluation tool. Thus, the data would have to be maintained in two different formats if compatibility with both vendors' evaluation tools is required.

Additionally, there is an issue of data integrity between the applications pre-dominantly used in radio engineering and also between these applications and the rest of the network provider's business. Solutions must also often comply with certain integration requirements, e.g. using Unix server platforms and integration based on open standards.

Although one simplistic approach to data integrity provides a database providing a single source from which applications access data, purchasing packaged software usually precludes this simplistic approach because application vendors need to manage the data relevant for each application. Hence, different applications have different data within an organization.

These problems are further compounded by local or regional copies of applications with the result that across a network provider's national organization, it is extremely time consuming to produce reports, such as site counts, and to track developments for marketing updates. In addition to a data integrity problem, companies suffer reduced efficiency and quality from lacking consistent working practices across the organization.

Moreover, as network providers change or add to their network configurations, it becomes difficult to accurately measure or optimize the performance of existing network configurations. For instance, assessing the performance after any change in network configuration requires new data to be gathered (for example, using drive tests), thereby requiring further investment of time and effort. Once such new data is gathered, network providers still face the additional problem of appropriately integrating the new and existing data in analyzing network performance.

Additionally, when planning changes or evaluating hypothetical changes to network configurations, network providers struggle to obtain accurate predictions of network performance to inform their design and implementation decisions. In particular, conventional approaches provide no way to estimate network conditions for configurations without collected performance data or for configurations with incomplete performance data.

In a related obstacle for network providers, measuring performance in changed and hypothetical/proposed networks is also problematic because of the presence of undetected invalid measurements within existing data. Detecting these suspect or invalid measurements from configuration changes is difficult in view of time, budget, and technical constraints.

Therefore, a heretofore unaddressed need exists in the industry to address the any one of the aforementioned deficiencies and inadequacies.

SUMMARY

An embodiment disclosed herein includes a system and method of managing collection and maintenance of performance data for a wireless communications network including collecting configuration data for the network, encoding the collected configuration data and storing the data, collecting a transmitted signal, measuring a parameter of the collected signal, and encoding and storing the parameter. These steps are repeated for additional configurations of the network. The transmitted signals are transmitted by a base station or a mobile device. Further, the transmitted signals are collected by a base station or a mobile device.

In another embodiment, a system and method of collecting performance information related to the configuration of network elements for communicating with a mobile device is disclosed. This method includes collecting performance data for a first configuration of network elements, encoding the collected performance data for the first configuration, collecting performance data for a second configuration of network elements, encoding the collected performance data for the second configuration, and predicting performance data for a third configuration as a function of the performance data for the first and second configurations of network elements. Each of the first, second, and third configurations of network elements are distinct configurations.

In yet another embodiment, a system and method for evaluating the performance of a wireless communications network including a plurality of base stations for communicating with a plurality of mobile devices is disclosed. This method includes collecting configuration data for the network, measuring a parameter of communications signals transmitted in the network, receiving a request for a measured parameter for a specified network configuration, and providing the requested parameter which is valid for the specified network configuration.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the claims.

BRIEF DESCRIPTION OF THE DRAWINGS

Other systems, methods, features, and advantages of the present disclosure will be or become apparent to one with skill in the art by reference to the following detailed description when considered in connection with the accompanying exemplary non-limiting embodiments, wherein.

DETAILED DESCRIPTION

Integrating applications and associated data as provided by embodiments of the following application enable improved performance and configuration data integrity and consistent working practices across a company, thereby increasing efficiency and service quality. Various embodiments as disclosed can be used along-side, independently of, or integrated with both custom and off-the-shelf network management systems. Examples of these systems include, but are not limited to, cellular radio planning software, automated cell planning tools, program/project/asset management tools, wireless network drive test systems and other air interface measurement solutions, measurement-based prediction tools, measurement data management tools, network management systems, and remote antenna operation systems.

Figure 9:
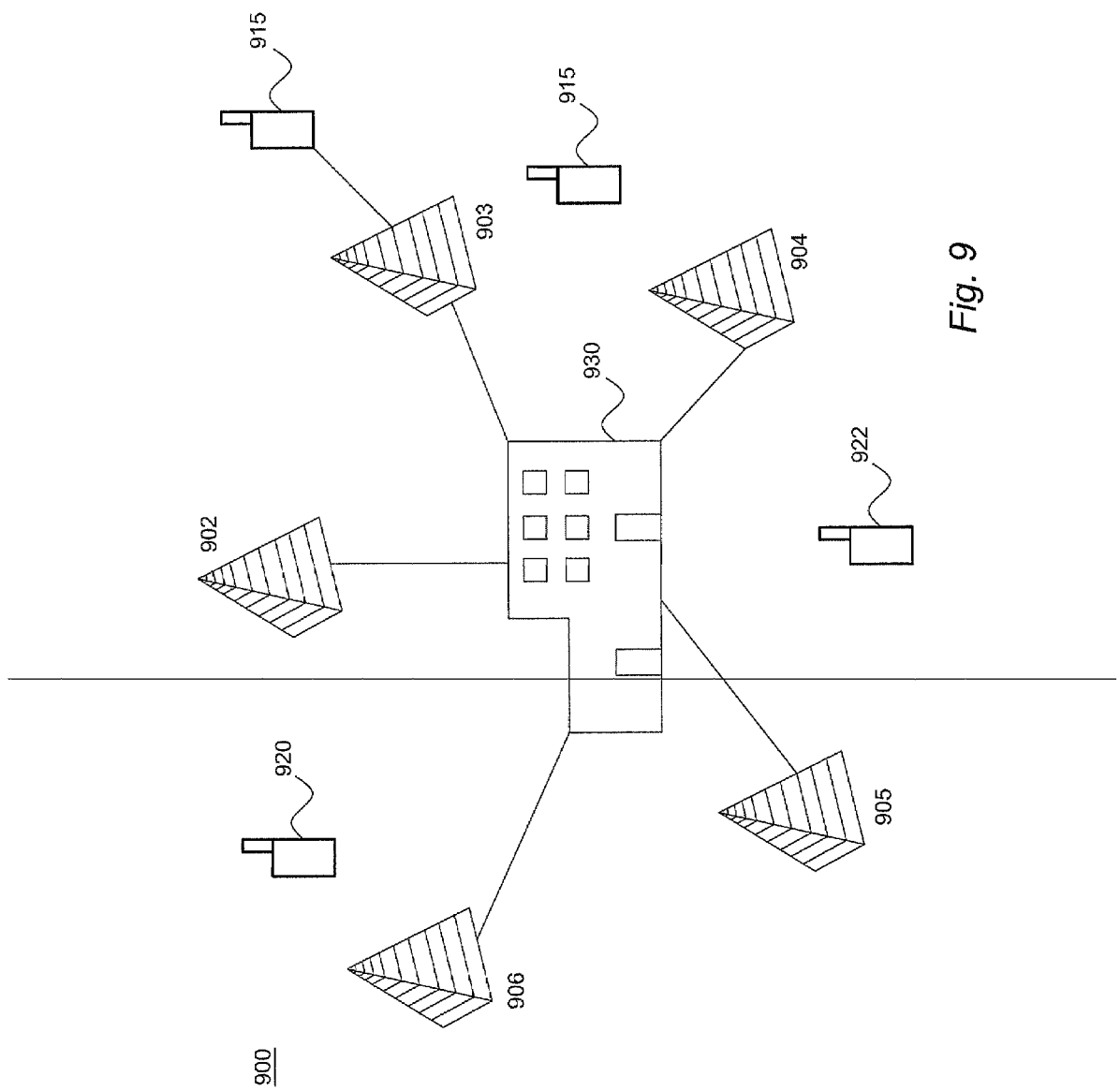
FIG. 9 is an illustration of an exemplary wireless communications system according to an embodiment of the present subject matter.

FIG. 9 is an illustration of an exemplary wireless communications system according to an embodiment of the present subject matter. With reference to FIG. 9, a wireless communications system 900 or system is shown. Plural communications elements 915 may be dispersed throughout the system. The wireless system 900 serves mobile stations 920, 922 within reception range of one or more base stations 902-906. The base stations 902-906 may be connected to a central entity or central network unit 930.

A successful network rollout, configuration change, or upgrade involves a number of complex tasks including coverage prediction and data analysis before and after installation. Network providers and operators require tools, services, and solutions that facilitate the optimization of networks throughout their lifecycle, speeding deployment, reducing costs, and ensuring a high quality of service.

Figure 8:
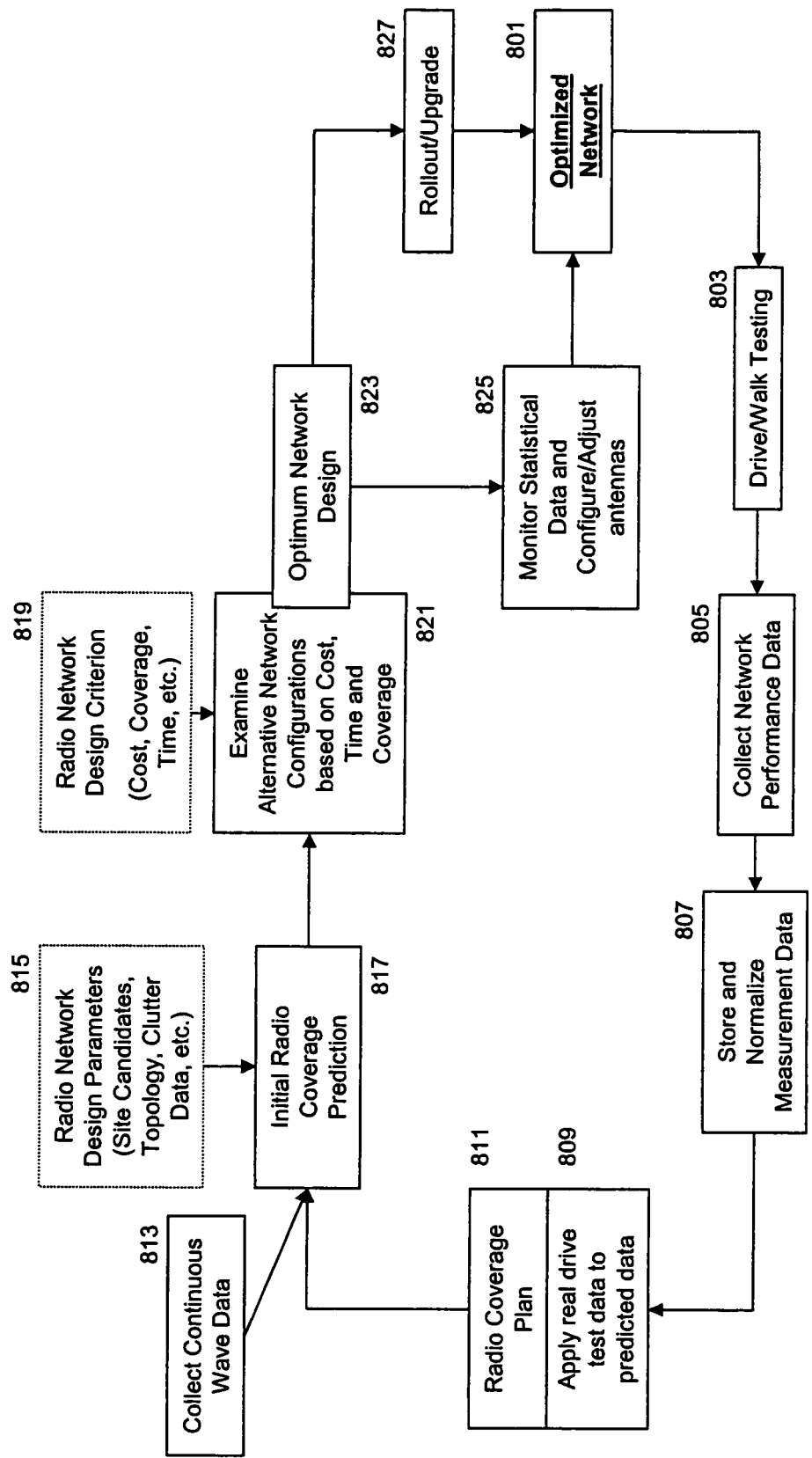
FIG. 8 is a schematic representation of a network planning and optimization process.

FIG. 8 illustrates an exemplary network planning and optimization process. Given a current or previously optimized network configuration 801, performance data is collected 805 using, for example, drive and walk testing 803. Measurement data is then stored and normalized 807. The collected data is then applied to predicted data 809 to produce a radio coverage plan 811. Initial radio coverage 817 is then predicted utilizing, for example, continuous wave data 813 and radio network design parameters 815 (including, but not limited to, site candidates, topology, and clutter data). Alternative network configurations are examined 821, taking into account radio network design criterion 819 (including, but not limited to cost, coverage, and time), to produce an optimum network design 823. This design 823 assists in the rollout and upgrade of the network configuration 827 as well the monitoring of statistical data and configuration or adjustment of antennas 825.

Various applications assist and enable this process. These applications include, but are not limited to, cellular radio planning software, automated cell planning tools, program/project/asset management tools, wireless network drive test systems and other air interface measurement solutions, measurement-based prediction tools, measurement data management tools, network management systems, and remote antenna operation systems. Major technologies are supported, including, but not limited to, 2G, 2.5G, 3G -HSDPA, UMTS WCDMA, CDMA/CDMA2000, 1X/1xEV-DO, GSM/GPRS/EDGE, IS-136, iDEN and AMPS.

These solutions assist at various points in this process. For instance, radio planning software predicts signal propagation to speed implementation of wireless technology. Automated cell planning tools automate the network evolution process by optimizing cell plan and site parameters and seeking to maximize overall performance in view of component performance indicators. Network management and program/project/asset management systems actively manage projects and assets within the network to optimize or improve performance of the network through regular use or during upgrades, additions, or other modifications. Air interface measurement solutions enable network providers to view service from the perspective of subscribers, providing critical quality of service measurements including, but not limited to, failed originations, dropped calls, and call quality.

Various disclosed aspects address various portions of the process including data collection and maintenance for configuration data and measured performance data to enable and improve the network configuration process by improving measurement-based performance predictions. Embodiments disclosed herein optionally use existing drive test data, import survey files, update drive test data to synchronize with network parameter changes, normalizes survey data to provide metrics for measurement based prediction software, and filter and associate normalized data with coverage prediction parameters.

Performance data in a wireless communications system is collected to create an accurate measurement of network conditions to identify anomalies, plan upgrades, optimize performance, and predict performance. Over time, the network configuration may change. Wireless communication networks generally include a plurality of base stations for communicating with a plurality of mobile devices. In addition to the changes in mobile devices (whether by addition of new customers/users, existing consumers upgrading to new or more advanced mobile devices, or even the changing position of mobile devices over time), network configurations and compositions also change. Examples of network components include, but are not limited to, antennas, receivers, transmitters, encoders, diagnostic equipment, mobile devices, base stations, switches, hubs, processing elements, and terrain. Although overlooked by conventional solutions providers, the disclosed embodiments recognize that data collected for previous configurations can still provide useful information despite the configuration changes.

For example, with embodiments of the present invention, the performance characteristics of a previous configuration are useful in predicting expected performance of the new configuration. The previous configuration data is also useful in evaluating hypothetical networks during the planning phase. To fully utilize such performance data, the data is time stamped (or otherwise encoded) and associated with the network configuration that then existed when the performance data was collected. Encoding includes temporal or state-indicating data including, but not limited to, time, day, month, year, or relative time/state measures in the context of other components or changes in the network configuration. Relative time measures include time designations or time measurements between configuration changes, between network element changes, and between service disruptions or lags in performance, and other measures determined by the user or data-requesting application. Further, other encoding methods include geocoding, encoding particular communications, and encoding particular communications devices.

Previous or conventional data collection and management systems for wireless performance data do not provide the advantageous historical maintenance and integration disclosed in the present application. The current application provides system and method including a data interpolator (DI) to estimate network conditions for configurations for which no or incomplete performance data has been collected.

As noted above, effective maintenance and integration of performance data becomes increasingly crucial when a network provider changes or looks to change the configuration of all or part of its network. Several process classifying how existing and new configurations of network elements, as well as related applications, are used within a wireless network provider. These processes include data producer processes, data consumer processes, and a data interpolator.

Data producer processes are processes that produce performance information or records that indicate other characteristics of the network such as signal strength or interference. Such processes include network performance data, E911, and drive test data. Each of these data sets are time-indexed and associated with a network configuration snapshot at the time the data is collected. If the data is collected over a significant period of time, the data is subdivided so that each subset can be associated with an individual configuration.

Data consumer processes are processes that use historical data to produce derivative outputs. The simplest class of data consumers are reporting functions that merely print out subsets of data or summaries. Planning tools and optimizers are another class of consumers that use the historical data to predict future network performance or to recommend alternate network configurations. Data consumers may request data for specific network configuration or for a hypothetical configuration. In the case of antenna optimization tools the optimizer may request a series of propagation predictions for a range of antenna configurations.

The data interpolator (DI) provided by embodiments disclosed herewith creates an accurate estimate of network conditions for one or more hypothetical network configurations. The hypothetical configuration may match or approximate a current or previous network configuration, or subsets thereof. Alternatively, the hypothetical configuration may match or approximate a future or planned network configuration, or subsets thereof.

Figure 1:
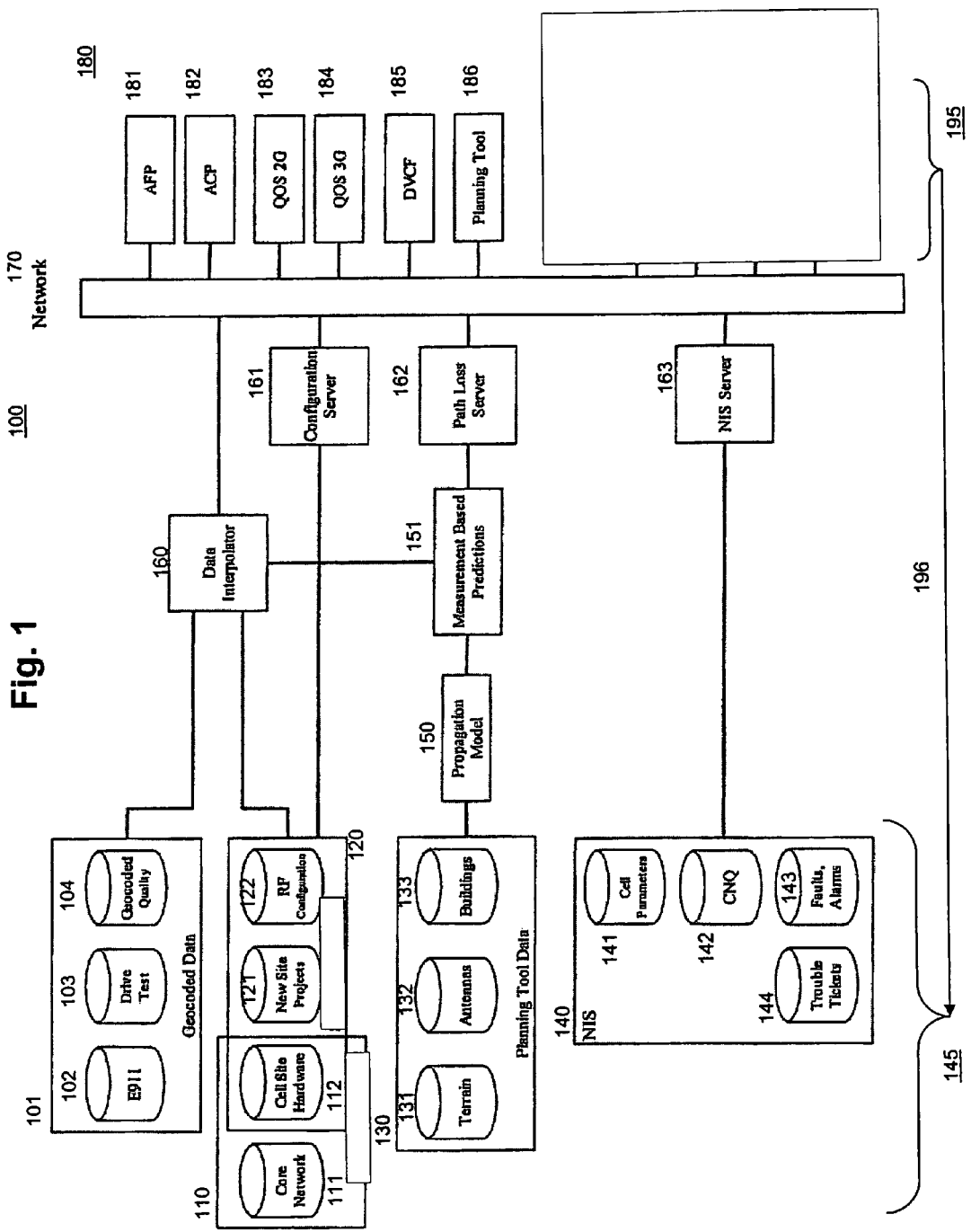
FIG. 1 is a schematic representation of a data model for the presently disclosed system and method.

FIG. 1 illustrates an exemplary data model of an embodiment of the present system and method. It describes classes of databases and applications and details of particular individual components.

Other systems such as a Network Management System (NMS) may optionally be included. NMS acts either as a data source when reporting current antenna configurations or as a control system when used to reposition antennas. In the first instance, NMS is a data source for the RF configuration data. In the second instance, NMS is not part of the illustrated model.

Enhanced Network Optimization (ENO) is another application with respect to data management that may optionally be included. Providing data management, data analysis, network optimization, and automatic optimization functions, ENO may impact antenna configurations and network performance. ENO also impacts network parameters, frequencies, and codes. Data analysis functionality includes analysis of propagation, quality, hardware, and system data, as well as traffic and RF map data. Further, with regard to network optimization, ENO is used to advise on network parameters, frequencies, codes, and antennas, and also provides performance targeting and scheduling features. In addition, ENO provides automatic optimization features such as self monitoring. ENO functionality may optionally be represented as a feed back loop 196 from the application side of the page back to the databases 145.

Data sources 145 are represented as cylinders (for example, 102-104). Sources are predominantly collections of measurements or databases from another source. The Geocoded data sources 101 are different types of measurements. E911 data 102 is derived from the E911 system. Geocoded quality 104 can be derived from either the E911 system or drive tests data 103. The configuration data and the performance data can be stored in suitable computer memory, including without limitation, a single database, multiple databases, distributed databases, synchronous or asynchronous databases, and thus can be accessed as needed using query techniques.

The Network Information Service (NIS) system 163 incorporates a number of databases 141-144. The network 170 is the source of most of this data although trouble tickets 144 are from trouble ticket tracking system. The core network and site information is entered manually, through automated processes, or some combination thereof. Project management systems provide an interface for entering and managing site information.

Planning tools are also included, including conventional tools used in industry such as profile loss models for losses along the line. In one embodiment, there is a single propagation model 150. Alternatively, multiple propagation models share the same data. Such a multiple propagation model approach may be implemented, for example, to reduce complexity during a transition period. A network provider can then require the propagation models to conform to a specification which will ensure consistent results from one application to the next.

The square boxes 160-163 in the diagram represent data servers acting as interfaces between the data sources 145 and the applications 195. Applications 180 such as ACP 182 sometimes require extensive interactions with the path loss server 162. It that case, a more responsive interface is optionally defined. Further, performance may also be improved by co-locating the ACP server with the path loss server. The applications 195 are the data consumers from the stand point of the system. In selected embodiments, the applications may produce intermediate data that is then used for various analysis and reports. In other implementations, the rest of the system does not interact with the derived data sets.

The data interpolator (DI) 160 is a component for enhancing the performance of autonomous data collection systems or for E911. The DI receives at least two types of inputs: configuration data and related measurements or performance data. The measurements (performance data) and configuration data are time stamped with temporal information. Configuration data may be reported as changes occur or periodically.

Embodiments of the DI identify data which may be applied directly to the requested network configuration or provide an estimate in instances in which there is not an exact match. Even in instances where there is an exact match, Bayesian estimation methods can optionally be used to augment data with closely related data. Alternatively, interpolation methods include, but are not limited to, linear, polynomial, and spline methods.

In selected embodiments, the measurements arrive periodically or intermittently. Alternatively, the measurements may arrive in a substantially continuous stream. The configuration information is typically event driven, but can also be periodically or intermittently gathered/refreshed. For example, measurement and configuration data are generated as individual sites are changed or generated through periodic snapshots. The measurements and the configuration data are encoded (for example, time stamped). Optionally, the measurements and configuration data can be synchronized, depending on how the data is collected. For instance, the network can generate labeling information of a call, or drive test equipment geocodes the measurement. The DI uses time stamp information to create an overall network configuration at a particular moment in time. In selected embodiments, the DI further uses the time stamp information to track and maintain various configurations over time.

In response to the user or system-prompted request for a particular configuration, the DI compares the requested configuration to a series of historical network configurations. The DI compares the requested configuration to each of the historical configurations and then adjust the measurements according to the differences that are detected. In some cases the measurements may be used as is. In others the data will be augmented with path loss estimates from the propagation model.

Measurement Based Prediction (MBP) is the module 151 that combines measurements and predictions. In locations where data is available the estimated level approaches the measured value. In areas where measurements are sparse the estimates are a weighted combination of the predicted signal levels and the measurements. Weighting approaches include, but are not limited to, additive, multiplicative, exponential, logarithmic, polynomial, and probabalistic approaches and combinations thereof. In selected embodiments, MBP uses Application Program Interface (API) to a propagation model. For each antenna, MBP subtracts the predicted signal level from the propagation model to produce a residual. Optionally, MBP optimizes the model using a multivariate regression to adjust the model to minimize the total mean squared error (MSE). In either case, the result is a collection of values with an average equal to zero with no spatial trend to the data.

Variables with these characteristics are well suited to an interpolation method called Krieging. In Krieging, the correlation between values decreases with the distance between the locations associated with those values. Exactly how the correlation decreases is defined by a function called a variogram.

The variogram determines how measurements are weighted and maximizes the accuracy of the resulting interpolated values. The variogram is a function that goes from zero to infinity. At a distance of zero the variogram is typically zero and it increases up to a point and then levels off. A value of zero implies 100% correlation and a value of 1.0 implies a correlation of zero.

Once variogram is obtained, weights are assigned to the measurements to obtain the best accuracy possible. In many interpolation methods the interpolated values are inversely weighted by distance from the interpolation point. The variogram produces this behavior but it has an additional benefit. If there is a cluster of measurements at some distance from an interpolation point with a few individual measurements scattered about the points in the cluster can be deemphasized.

in the various embodiments disclosed herein, the DI performs several functions, including non-limiting exemplary functions listed below.

In one function, other applications may request data corresponding to a given configuration of network elements. The interpolator returns a set of measurements, for instance to the MBP or user-system interface, that were collected when the network configuration met the specified conditions.

Regarding an another function, another application, such as a measurement-based prediction tool, may request a configuration snapshot for a given moment in time. In this mode the DI collects the most recent information for each network element. In addition it identifies which elements had indeterminate configurations at the requested time. If the configuration data is reported periodically, then an indeterminate configuration is detected by finding those elements that had a changed configuration immediately in the first configuration report after the requested time.

Concerning yet another function, in some instances an exact match will not be found or it may be beneficial to obtain an increased volume of data by collecting data that is corresponds to a closely related network configuration. For example, data from antennas that were at nearly the same height may be modified using well known techniques to estimate the signal levels that would occur when the antennas are in the specified configuration.

Particular methods are applied to determine which data is relevant. These methods are optionally related to how confidence is assigned to the configuration data at a particular moment in time. Other methods optionally concentrate on how data from one configuration may be applied to another so data modeling methods are used to inform the data interpolator how to identify relevant data or which configurations are sufficiently similar to justify obtaining the related data.

One way in which disclosed embodiments achieve improved data integration is through linking (correlating or associating) the performance data with the best estimate of the configuration existing at the time the performance data was collected. For example, when a network configuration is first implemented or changed, the configuration data is time stamped. As periodic performance data for the network is collected, the performance data is also time stamped. When an evaluation tool requests that the performance data for a specified configuration be retrieved, the performance data corresponding to the time during which the specified configuration was implemented is accessed.

Thus, even if a specified configuration no longer exists, selected embodiments can provide performance data for the specified configuration if the configuration previously existed.

Figure 2:
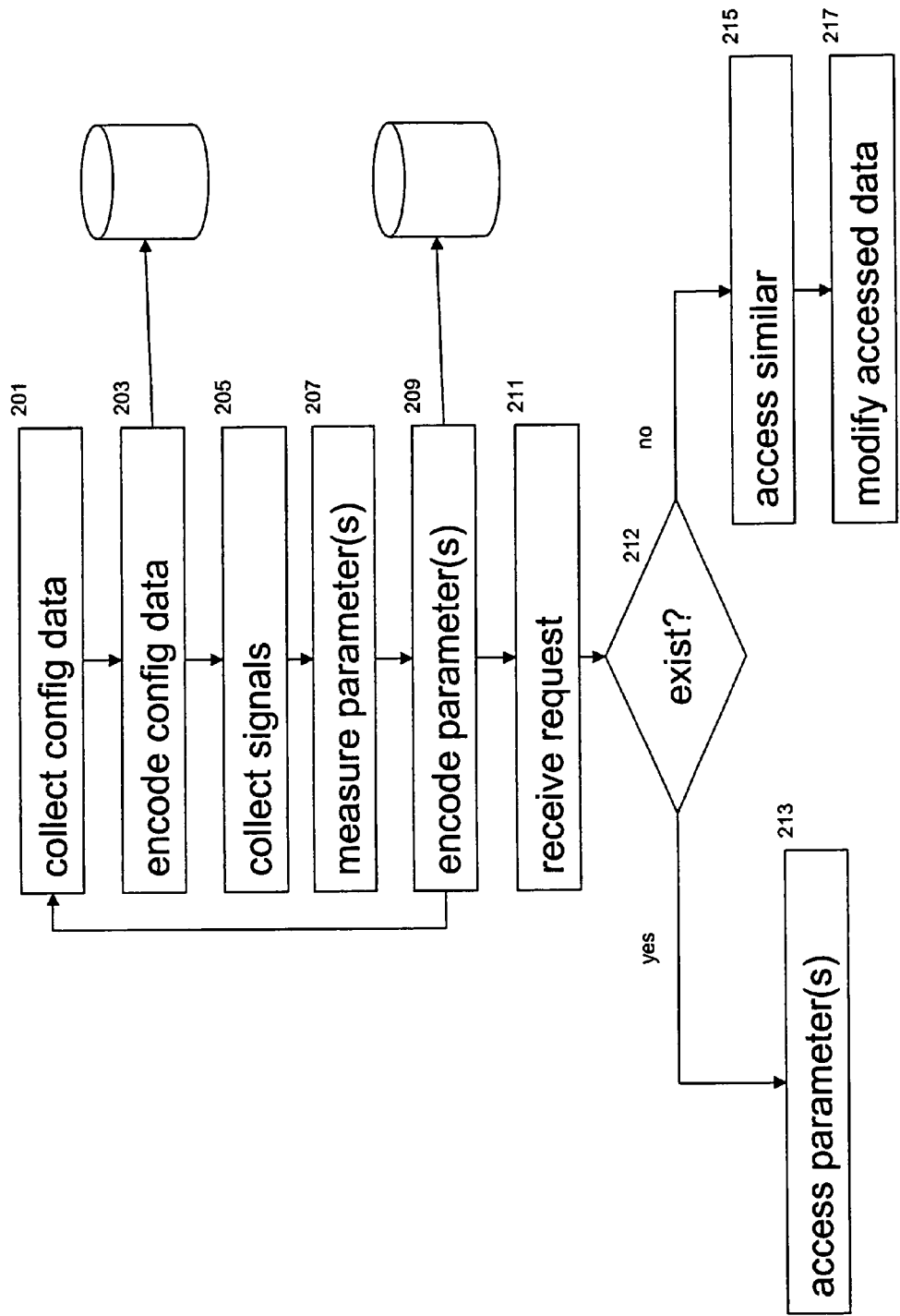
FIG. 2 is a schematic representation of a method related to managing the collection and maintenance of performance data for a network.

FIG. 2 illustrates an exemplary process flow related to managing the collection and maintenance of performance data for a network. Configuration data for a wireless communications network is collected 201. This collected configuration data is then timestamped 203. The timestamped data is then stored in a first database. Sequentially or concurrently, signals transmitted by a mobile device are collected at a base station (or base stations) 205. In other selected embodiments, the signals may be transmitted by a base station and collected at the mobile device (or mobile devices). At least one parameter of the collected signal is measured 207. Parameters include, but are not limited to, signal level, block error rate, bit error rate, system control messages (including, but not limited to, mobile request for handover requests and commands, lists of channels to measure), and geocoded forms thereof. The parameter or parameters are timestamped and stored in a second database 209. Optionally, the first and second databases may be implemented using a single database. The described process is repeated for multiple configurations. In non-limiting examples, these multiple configurations can be current configurations, previous configurations, hypothetical or proposed configurations, combinations of these configurations, and subsets of past, existing, or proposed configurations.

In another aspect, selected embodiments receive a request for one or more measured parameters for a specified network configuration 211. For example, a user or software can request all signal levels matching a particular antenna configuration at a particular site. Alternatively, a user or software may request which cells were serving when a particular configuration existed. The system then accesses the requested measured parameter(s) for a time period during which the specified network configuration existed 213.

In certain instances, the specified network configuration does not exist in the database, contains incomplete data, or is otherwise unavailable. If the system determines that the requested configuration does not exist or is unavailable 212, the system accesses a corresponding parameter (or parameters) of a network substantially similar to the specified configuration 215. For example, changing existing data antenna height to take into account additional or reduced loss. Then, the system modifies the accessed data to correspond to the specified configuration 217.

Examples of Data Modification include, but are not limited to: transmit power level changes, antenna changes at the same height, and changes in antenna height or location.

Transmit Power Level Changes: increasing or decreasing measurements by the same amount as a change in the transmitted signal level to predict the new signal levels that will result after a transmit power level change.

Antenna Changes At the Same Height: predicting the effects of antenna changes. Similar to the previous example, the received signal is changed by the same amount as the change in the transmitted power, but now this change depends on the angle from the antenna. If the location of antenna2 is the same as the location of antenna1, the difference in directional transmit power is applied to each measurement point.

If there are no obstructions or significant reflections then the difference in antenna gain and the power into the antenna connector may be applied directly. If a diffraction point is in the path the change in gain that is applied should be in the direction to the first diffraction point. If reflections are considered as in a ray tracing model then the difference in gain should be applied separately to each path.

Changes in Antenna Height or Site Location: The more substantial the changes, the error related to the environment around the mobile is less confined to the area around the mobile, and the prediction also incorporates the location of the antenna as a factor. However, if the changes in height or position are small or moderate, then to a large degree, a significant portion of the error can be assumed to be related to the environment around the mobile and the resulting error is independent of the location of the antenna. Then the difference in predicted path loss is applied to predict the change in signal level.

Figure 6:
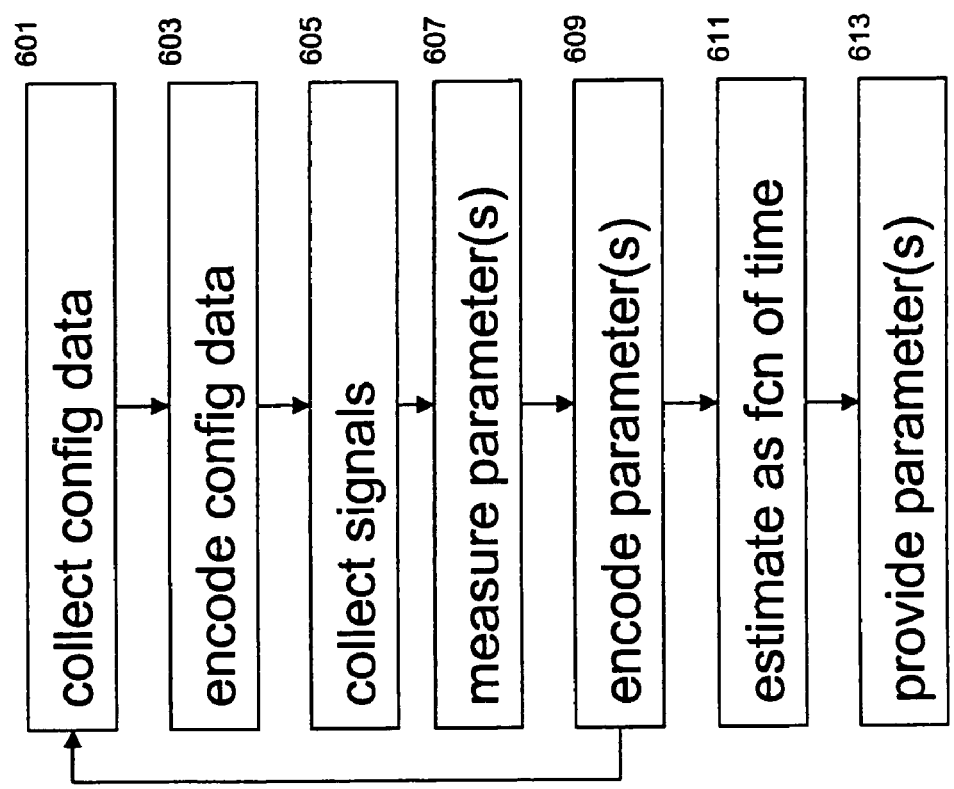
FIG. 6 is a schematic representation of functional aspects related to a specified time.
Figure 7:
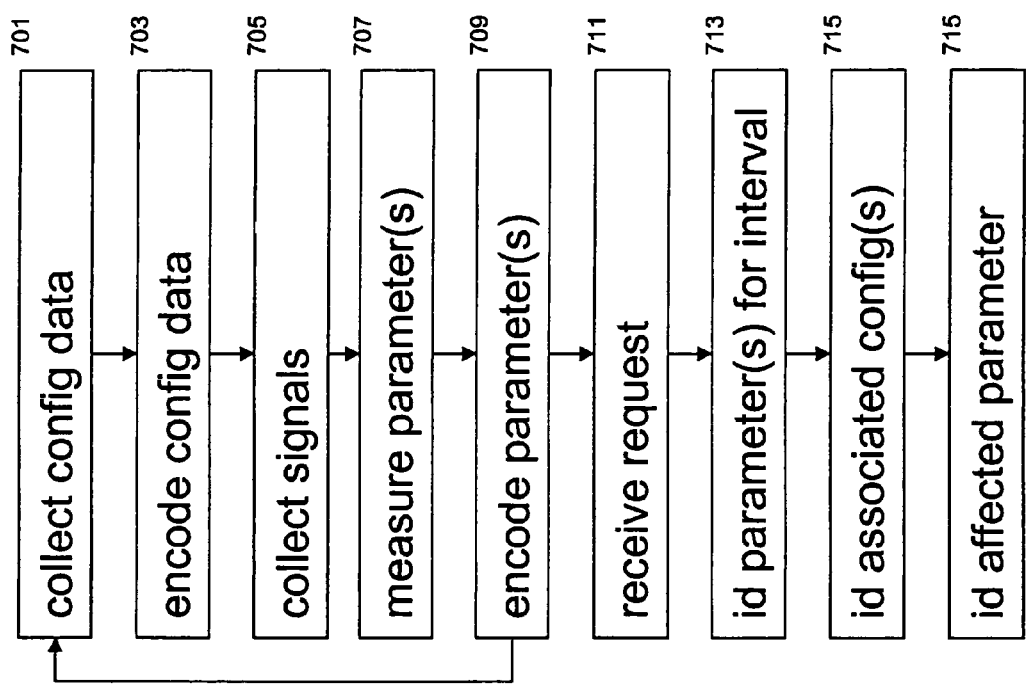
FIG. 7 is a schematic representation of functional aspects related to a time interval.

FIGS. 6 and 7 illustrate additional embodiments of the method and system including other functional aspects. Referring to FIG. 6, select embodiments include estimating the network configuration as a function of a specified time 611 and providing a measured parameter that is valid for the estimated network configuration 613. For example, if a number of dropped calls are experienced in a particular area and time, performance and configuration data corresponding to that time is requested from the DI. Optionally, the DI highlights changes that occurred at approximately that time. In another non-limiting example, the validity of the measured parameter is accomplished through, for example, sanity checks (look at outer bounds of measurements for a configuration) and statistical evaluation.

Referring to FIG. 7, alternative embodiments of the system and method receive a request for a measured parameter (or parameters) for a specified time interval 711 and identifying the parameter(s) for the specified time interval 713. In a non-limiting example, a specified time interval could be related to, for example, a period within which service was disrupted or call were dropped. Additionally, network configurations associated with identified requested parameter(s) for the specified time interval are identified 715. These embodiments also enable the identification of a requested parameter(s) which may have been affected by a network configuration change during the specified time interval 717.

In addition, when performance data is requested for a specific interval, the performance data can be segregated into blocks corresponding to the specific network configuration at the time the performance data was collected. Thus, performance data for a specific time interval may be segregated into two or more blocks if the network configuration changed during the specified time interval. For example, when an antenna configuration changes, a new block of performance data for the new configuration should be started. Performance data segregated in blocks facilitates the prediction of performance parameters for new network configuration by allowing extrapolation of the blocks of existing performance data on a block by block basis.

Selected embodiments also enable the identification of suspect measurements. By retrieving data for a specific time interval, configuration changes which occurred during the time interval can be identified, and performance data which could be affected by such configuration changes can be identified and weighted as necessary. For example, if the position of an antenna changes and it was known to have occurred within 10 minutes of 2 pm, then any data collected from that antenna between 1:50 and 2:10 would be regarded as suspect.

Figure 3:
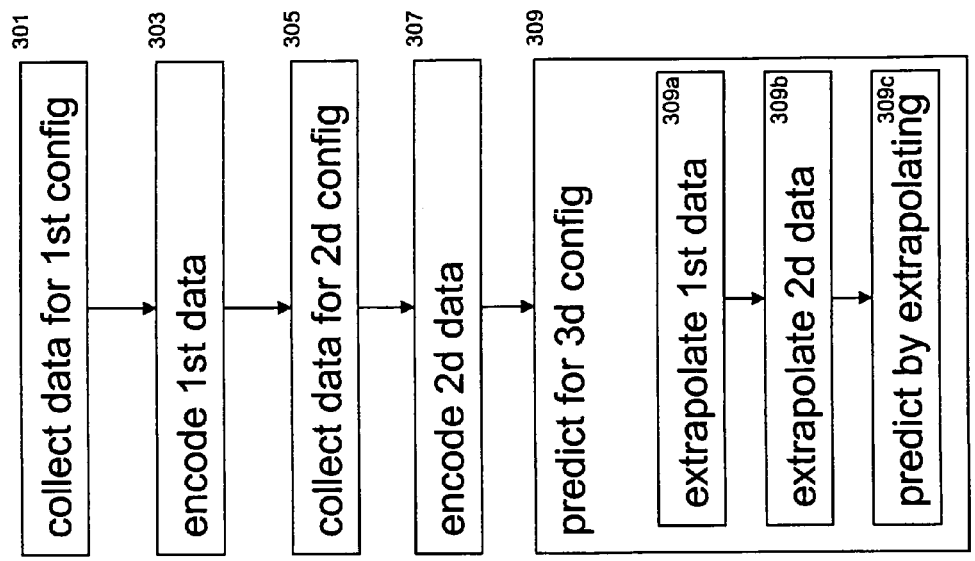
FIG. 3 is a schematic representation of an aspect related to collecting performance information related to the configuration of network elements of a network.

FIG. 3 illustrates another aspect related to collecting performance information related to the configuration of network elements of a network. In this aspect, performance data for a first configuration of network elements is collected 301. The performance data is collected, for example, periodically. The collected performance data is then timestamped and stored 303. Sequentially or in parallel, performance data is collected for a second configuration of network elements 305. This performance data is also timestamped and stored 307. Where the first and second configurations are not the same as a third configuration (for instance, a newly implemented or hypothetical configuration), performance data for a third configuration is predicted as a function of performance data for the first and second configurations 309. It is noted that data collection in this aspect is alternatively accomplished intermittently, non-periodically, in event-driven fashion, or in some combination of these. Examples of performance data include, but are not limited to, SNR, BER, BLER, and SQE.

In further selected embodiments, by using a DI, performance data is estimated for hypothetical configurations that did not previously exist. Predicting performance data for the third network configuration includes extrapolating performance data for the first and second network configurations 309*a*, 309*b* and predicting the third network configuration performance data by extrapolation from the extrapolated performance data of the first and second configurations 309*c*. For example, although data for two existing or previous (previously existing or predicted) network configurations may be incomplete, performance data making these performance data sets substantially complete (or otherwise useful for further extrapolation in the next step) is generated. Thus, performance data can still be generated regarding a third configuration different from the first two. Performance for this third configuration is predicted by further extrapolation from the performance data (both existing and generated through extrapolation) of the first and second network configurations. For example, BER or BLER can be extrapolated from estimated signal levels corresponding to interpolated signal measurements (the interpolation including non-limiting examples of antenna height, changes in handover parameters, power levels). For example, extrapolated performance data from antennas that were nearly at the same height as the specified configuration may be modified to estimate the signals levels that would be expected from the specified configuration.

Figure 4:
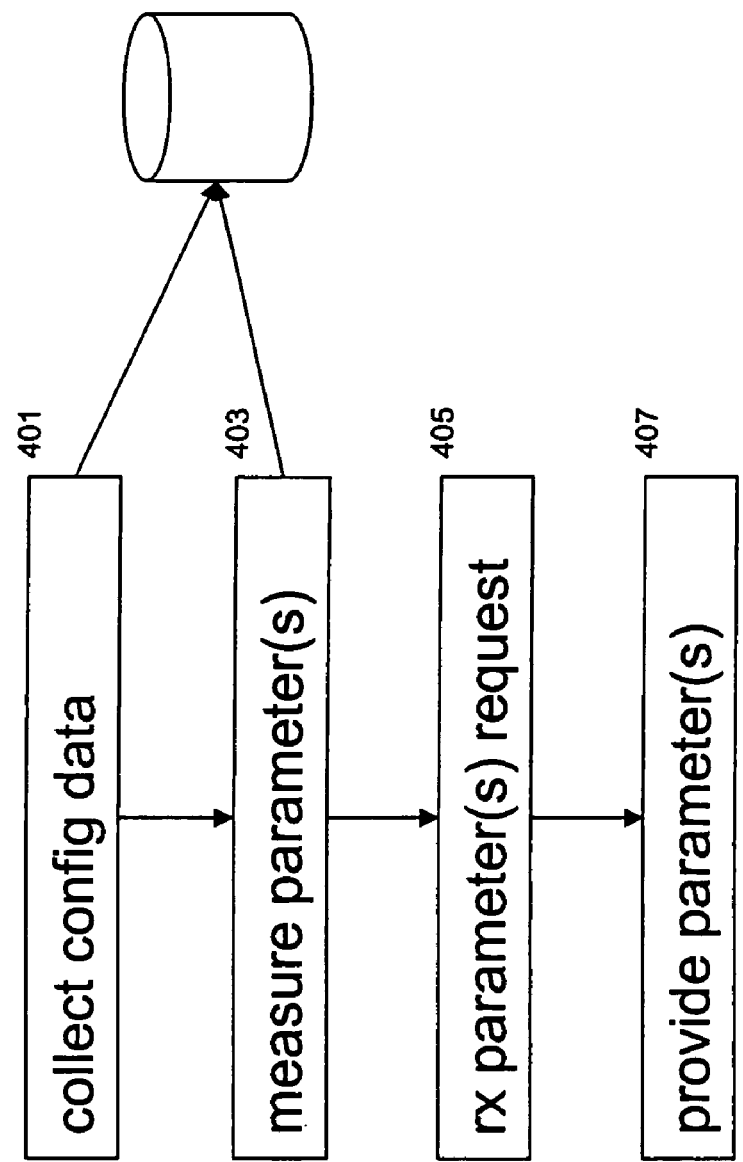
FIG. 4 is a schematic representation of illustrates an aspect directed evaluating the performance of a network.

FIG. 4 illustrates yet another aspect directed evaluating the performance of a wireless communications network including a plurality of base stations for communicating with a plurality of mobile devices. In this embodiment, configuration data for the network is collected and stored 401. At least one parameter of communication signals transmitted in a network are measured and stored 403. A request for one or more measured parameters is requested for a specified network configuration 405. The requested one or more parameters is provided which is/are valid for the specified network configuration 407. Optionally, the collected configuration data and the measured parameter(s) are encoded with a temporal designator.

Certain embodiments also identify data measurements that are no longer valid due to a change in the configuration of the network. For example, in prior art systems, the retrieval of measurement data for a current configuration may include measurements that are no longer valid due to a change in the network configuration since the last time the measurement data was collected. A performance evaluation that included consideration of this invalid data results in an inaccurate evaluation of the network.

Figure 5:
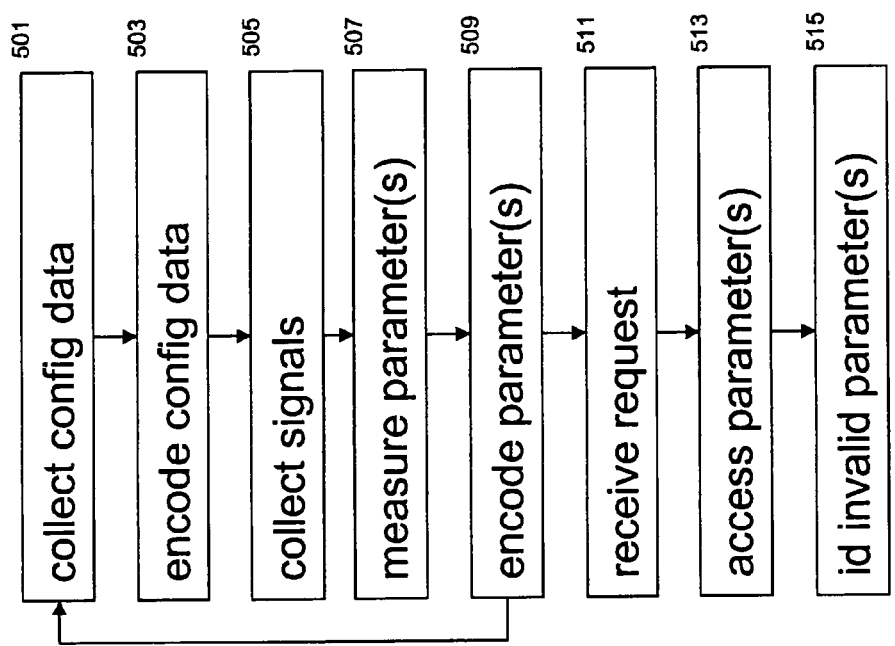
FIG. 5 is a schematic representation of an aspect including the identification of an invalid parameter.

In various presently disclosed embodiments, measurement data that was no longer valid due to a change in the network configuration is identified as such. FIG. 5 illustrates the identification of an invalid parameter 515. In addition to providing valid parameters as discussed above, selected embodiments also identify parameters which are not valid for a specified network configuration. Thus, this functionality enables a user, another application, or the system to be notified when the certain parameters are invalid. Invalid parameters result for various reasons, including but not limited to, incorrect site locations, incorrect antenna positions, handover parameters, and other inaccuracies of any of the data stored in the configuration database that affect signal performance. Invalid parameters may arise in situations including, but not limited to, where a requested parameter does not exist, the requested parameter is returned but extrapolated with an accuracy less than a threshold set by the system or the user, or the requested parameter exists but only for configurations not sufficiently similar (either set by the system or the user) to the specified configuration.

By identifying the invalid parameters, these can be flagged as suspect and used by other systems and applications with increased scrutiny (for instance, by discounting the contributory weight of these returned parameters in models) or discarded completely. By discounting, discarding, or weighing this identified data appropriately, invalid data does not improperly influence the network performance evaluation.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order form that shown or discussed, including substantially concurrently or in reverse order, depending on the functionality involved, as would be understood by those reasonably skilled in the art of the present disclosure.

It should be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. In a wireless communications network having a plurality of base stations for communication with a plurality of mobile devices, a method of managing the collection and maintenance of performance data for the wireless communications network comprising:
    (a) collecting configuration data for the wireless communications network;
    (b) encoding the collected configuration data and storing the data in a first database;
    (c) collecting signals by at least one base station, the signals being transmitted by the mobile device;
    (d) measuring at least one parameter of the collected signal;
    (e) encoding the at least one parameter and storing in a second database; and
    (f) repeating steps (a)-(e) for a plurality of configurations, wherein encoding the parameter includes associating with a temporal parameter.

2. The method of claim 1, further comprising the steps of:
    (g) receiving a request for at least one measured parameter for a specified network configuration; and
    (h) accessing the at least one measured parameter for the time period during which the specified network configuration existed.

3. The method of claim 2 further comprising the steps of:
    (i) if the specified network configuration does not exist in the first database:
        (1) accessing the at least one parameter of a network substantially similar to the specified configuration; and
        (2) modifying the accessed data to correspond to the specified configuration.

4. In a wireless communication network having a configuration of communication elements for communicating with a mobile device, a method of collecting performance information related to the configuration of the network elements comprising:
    (a) collecting performance data for a first configuration of network elements;
    (b) encoding the collected performance data for the first configuration and storing in a database;
    (c) collecting performance data by at least one base station for a second configuration of network elements;
    (d) encoding the collected performance data for the second configuration and storing in a database; and
    (e) predicting the performance data for a third configuration as a function of the performance data for the first and second configurations, wherein the first, second and third configurations are not the same configurations, wherein encoding the parameter includes associating with a temporal parameter.

5. In a wireless communications network having a plurality of base stations for communication with a plurality of mobile devices, a method of managing the collection and maintenance of performance data for the wireless communications network comprising:
 (a) collecting configuration data for the wireless communications network;
 (b) encoding the collected configuration data and storing the data in a database;
 (c) collecting signals by at least one mobile device, the signals being transmitted by at least one base station;
 (d) measuring at least one parameter of the collected signal;
 (e) encoding the at least one parameter and storing in a database; and
 (f) repeating steps (a)-(e) for a plurality of configurations, wherein encoding the parameter includes associating with a temporal parameter.

6. The method of claim 5, further comprising the steps of:
 (g) receiving a request for at least one measured parameter for a specified network configuration; and
 (h) accessing the at least one measured parameter for the time period during which the specified network configuration existed.

7. The method of claim 6 further comprising the steps of:
 (i) if the specified network configuration does not exist in the data base:
  (1) accessing the at least one parameter of a network substantially similar to the specified configuration; and
  (2) modifying the accessed data to correspond to the specified configuration.

8. A method for evaluating the performance of a wireless communications network having a plurality of base stations for communicating with a plurality of mobile devices, comprising:
 (a) collecting configuration data for the wireless communications network and storing in a database;
 (b) measuring by at least one mobile device at least one parameter of the communication signals transmitted in the wireless communications network and storing in the database;
 (c) receiving a request for the at least one measured parameter for a specified network configuration; and
 (d) providing the requested at least one parameter that is valid for the specified network configuration,
 wherein the collected configuration data and the measured at least one parameter are time stamped.

9. The method of claim 2 further comprising identifying the at least one measured parameter which is not valid for the specified network configuration.

10. The method of claim 1 further comprising:
 (g) estimating the network configuration as a function of a specified time; and
 (h) providing at least one measured parameter valid for the estimated network configuration.

11. The method of claim 1 further comprising the steps of:
 (g) receiving a request for at least one measured parameter for a specified time interval;
 (h) identifying the requested at least one parameter for the specified time interval;
 (i) identifying the network configurations associated with identified requested at least one parameter for the specified time interval; and
 (j) identifying the identified requested at least one parameter which may have been affected by a network configuration change during the specified time interval.

12. The method of claim 4 wherein the step of prediction the performance of the third configuration includes:
 (i) extrapolating the performance data associated with the first network configuration;
 (ii) extrapolating the performance data associated with the second network configuration; and
 (iii) predicting the performance data for third network configuration by extrapolating the extrapolated performance data associated with the first and second network configurations.

13. The method of claim 4 wherein the collection of performance data is selected from the group consisting of: continuous collection, periodic collection, intermittent collection, event-driven collection, and combinations thereof.

* * * * *